(12) United States Patent
Herkert

(10) Patent No.: US 7,231,272 B2
(45) Date of Patent: Jun. 12, 2007

(54) SYSTEM AND METHOD FOR PROGRAMMING AND/OR OPERATING AN AUTOMATION SYSTEM WITH EXECUTION-ORIENTED COMBINATION LOGIC

(75) Inventor: Gebhard Herkert, Limbach (DE)

(73) Assignee: Siemens Aktiengesellschaft, Munich (DE)

( * ) Notice: Subject to any disclaimer, the term of this patent is extended or adjusted under 35 U.S.C. 154(b) by 390 days.

(21) Appl. No.: 10/407,936

(22) Filed: Apr. 7, 2003

(65) Prior Publication Data
US 2003/0191545 A1 Oct. 9, 2003

(30) Foreign Application Priority Data
Apr. 5, 2002 (DE) ............................... 102 15 196

(51) Int. Cl.
*G06F 19/00* (2006.01)
(52) U.S. Cl. .......................................... 700/97; 700/28
(58) Field of Classification Search .................. 700/11, 700/18, 87, 97, 1–10, 28, 83, 76, 98, 174, 700/86, 245; 717/1; 714/43; 715/763
See application file for complete search history.

(56) References Cited

U.S. PATENT DOCUMENTS

| | | | | |
|---|---|---|---|---|
| 5,450,346 A | * | 9/1995 | Krummen et al. ............. | 700/11 |
| 5,822,206 A | * | 10/1998 | Sebastian et al. ............. | 700/97 |
| 2001/0020291 A1 | * | 9/2001 | Kudukoli et al. .............. | 717/1 |
| 2004/0073850 A1 | * | 4/2004 | Opatemy ..................... | 714/43 |
| 2005/0091602 A1 | * | 4/2005 | Ramamoorthy et al. ...... | 715/763 |

OTHER PUBLICATIONS

Wood, R.L.; Aboody, F.: "CASE tools and Interactive process modeling accelerate the software development cycle for refined petroleum storage tank vapor recovery" Industry Applications Society 39th Annual Petroleum and Chemical Industry Conference, Sep. 28-30, 1992; p. 265-270.
Juer, J.; Oliver, J.J.: "Building and using graphical programming tools for the IEC 1131-3 standard [PLCs]" Advances in Software Engineering for PLC, Oct. 14, 1993, 5/1-5/4.
Carrott, A.J.; Moore, P.R.; Weston, R.H.; Harrrison, R.: "The UMC software environment for machine control system integration, configuration, and programming" IEEE Transactions on Industrial Electronics, vol. 43, No.1, Feb. 1996, p. 88-97.

* cited by examiner

*Primary Examiner*—Kidest Bahta
(74) *Attorney, Agent, or Firm*—Staas & Halsey LLP

(57) ABSTRACT

A system and a method for programming and/or operating an automation system has a programming system/method which presents the technological sequence as a chain of steps (or flowchart) but functions as a combination logic. For low-cost programming of the automation system accompanied by a high level of data consistency, it is proposed that, in order to program the automation system, a data program DP which can be executed on a data processing device and is formed, at the time of the execution, directly from a specific execution plan which contains the sequences of the program to be carried out as well as combination logic assigned to the sequences is provided. This results in an execution-oriented combination logic which can be used for designing, programming and/or documenting the data program of the automation system. The sequences and the combination logic assigned to the sequences are based here on a single data store so that when there are program changes no data inconsistencies whatsoever are produced, in contrast to previous solutions with different databases for designing, programming and/or documentation.

18 Claims, 5 Drawing Sheets

SYSTEM AND METHOD FOR PROGRAMMING AND/OR OPERATING AN AUTOMATION SYSTEM WITH EXECUTION-ORIENTED COMBINATION LOGIC

CROSS REFERENCE TO RELATED APPLICATIONS

This application is based on and hereby claims priority to German Application No. 102 15 196.2 filed on Apr. 5, 2002, the contents of which are hereby incorporated by reference.

BACKGROUND OF THE INVENTION

The invention relates to a system and method for programming automation systems and a computer program product for carrying out such a method.

Such a system is used in particular in the field of automation equipment. In order to create, process, analyze and display such an automation program, programming tools are used which can be executed on a data processing device and which are capable of graphically displaying the automation program or a part of an automation program. For this purpose, various methods of representation for the automation program are possible, for example structograms, automatic state machines, circuit diagrams, functional diagrams etc. Many automation programs are capable of being represented in different ways, for example as a structogram or as a program sequencing plan, as a circuit diagram or as a functional diagram.

SUMMARY OF THE INVENTION

One aspect of the invention is based on the object of permitting low-cost programming of the automation system accompanied by a high level of data consistency.

One aspect of the invention is based on the recognition that the previous programming techniques used in the field of automation equipment, for example execution-oriented programming or combination-logic-oriented programming frequently have problems with respect to data consistency. Such inadequate data consistency results in particular from the fact that data which is created, for example, by a planner of an automation solution is repeatedly converted into different representations and documentations by the programmer of the automation solution and/or the tester of the automation solution. Generally, different documents are produced which in each case do not have any connection to one another at all. Such inadequate data consistency is avoided in that the data program which contains the automation solution is embodied as an execution-oriented combination logic. The execution-oriented combination logic is composed here, on the one hand, of an execution plan with the respective processing engineering sequence, the execution plan and the sequences present in it providing, in terms of programming, a combination logic which is necessary in each case. In this way, it is possible to both document and program an entire automation solution by creating a single document in the form of the execution-oriented combination logic. Overall, this thus results in the representation of execution controls and the computer-internal processing logic of combination logic control systems being combined and designing, programming and documentation of combination logic control systems taking place here in one working step and on the basis of a single data store, such that overall low-cost programming of an automation system accompanied by a maximum level of data consistency is obtained.

A high level of efficiency is achieved by virtue of the fact that the execution-oriented combination logic of the data program is provided for designing, programming and/or documentation.

The expenditure, in particular on data maintenance, for example when there are changes, is effectively ensured by virtue of the fact that the data program which is formed from the sequences and from the combination logic assigned to the sequences and which has the execution-oriented combination logic is based on a single data store.

Handling of the system with a clear overview and thus in a user-friendly way is achieved by virtue of the fact that the execution plan is formed from states and state transitions, it being possible to assign a magnifying glass function to a state and/or a state transition, said magnifying glass function containing logic operations for the assigned state and/or for the assigned state transition.

In one advantageous refinement, the logic operations which can be edited by the magnifying glass function are implemented in a combination logic language and/or in an execution-oriented combination logic language. As a result, it becomes possible to integrate, even without previous knowledge, basic languages which have been used hitherto, such as Kontaktplan KOP, Funktionsliste FUP, Anweisungsliste AWL and others, into the system without effort.

A simple way of implementing the system is obtained by virtue of the fact that the system has a first unit for generating an execution structure from states and state transitions, at least for process engineering subsequences of the automation system, and a second unit for generating supplementary information which can be assigned to the states and/or the state transitions. This results in a data program with an execution logic which can be represented clearly, for the automation system.

Low-cost programming of a stored-program control system of an automation system is achieved by virtue of the fact that the execution structure which is generated by the first and second units forms a data program with an execution-oriented combination logic, which data program is provided for execution on at least one stored-program control system of the automation system.

User-friendly generation of the execution-oriented combination logic while using, to the greatest possible degree, existing experience of a user is achieved by virtue of the fact that first software components for characterizing a state and/or a state transition are provided for generating the execution structure, and second software components are provided for generating the supplementary information.

A clear combination of execution structure and combination logic can be effected in such a way that a magnifying glass function by which the second software object can be edited can be assigned to at least a first software object.

Advantageous primary components of an execution-oriented combination logic are obtained by virtue of the fact that the system has, as first software objects, a first "action" object type for characterizing a state, and a second "transition" object type for characterizing a state transition.

Low-cost programming is ensured by virtue of the fact that the first and second units are configured in such a way that designing, programming and documentation of the execution structure take place essentially in one working step.

A uniform data state is ensured for the respective requirements by virtue of the fact that designing, programming and documentation of the execution structure are based on a single data store.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
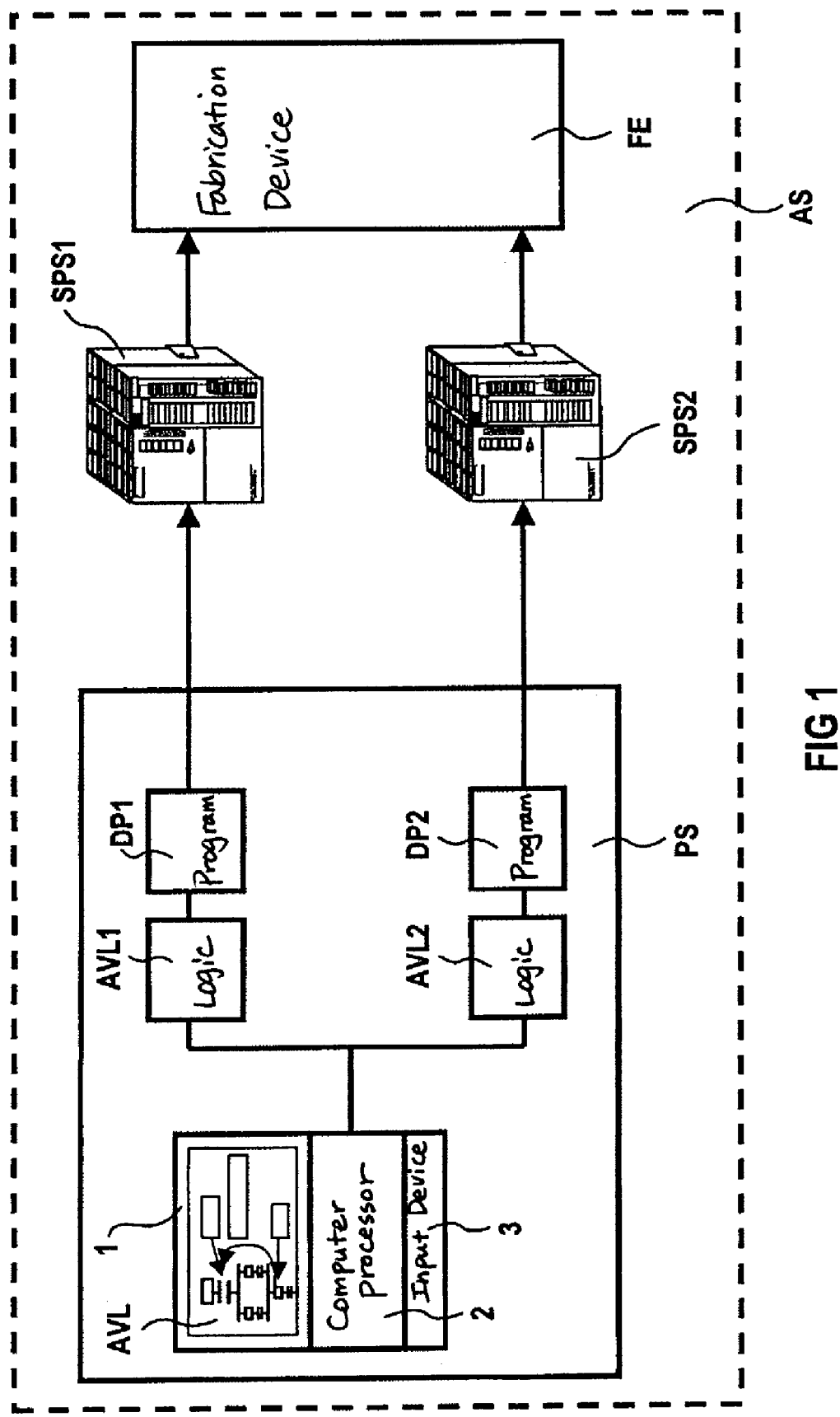
FIG. 1 shows a block circuit diagram of the basic design of an automation system.

Reference will now be made in detail to the preferred embodiments of the present invention, examples of which are illustrated in the accompanying drawings, wherein like reference numerals refer to like elements throughout.

FIG. 1 shows a basic view of a block circuit diagram of the programming of an automation system AS. The automation system AS is composed of a programming system PS, of a first stored-program control system SPS1, of a second stored-program control system SPS2 and of a fabrication device FE. The programming system PS is used to create a first data program DP1, which can be executed on the first stored-program control system SPS1, and to program a second data program DP2, which can be executed on the second stored-program control system SPS2. The programming of the first and second data programs DP1, DP2 is carried out using a computer 1, 2, 3 which is formed from a computer 2, an associated keyboard 3 and an associated screen 1. On the screen 1 of the computer 1, 2, 3, an execution-oriented combination logic AVL is illustrated by way of example, said combination logic AVL being also described in detail in conjunction with FIGS. 2 to 5. The particular feature of the exemplary embodiment illustrated in FIG. 1 is that both the first data program DP1 and the second data program DP2 are each based on an execution-oriented combination logic AVL1, AVL2.

The execution-oriented combination logic AVL1, AVL2 is programmed using the computer unit 1, 2, 3. Here, a chain of steps, for example in the form of a flowchart, which represents the technological sequence of the fabrication device FE to be programmed with it is generated in a special engineering tool which can be executed on the computer 1, 2, 3. However, at the same time a combination logic, which covers for example the behavior of an automation solution in the event of a fault etc., is integrated into this technological sequence, i.e. into this flowchart. The respective requirements can be covered by the combination logic even, for example, in the case of reversible processes with a large number of special states. The execution-oriented combination logic is based here in each case on a data source, i.e. changes in the execution-oriented combination logic are thus automatically taken into account in the designing, programming and documentation of the automation solution, so that it is not only the case that inconsistencies in it are avoided but they even become entirely impossible.

Figure 2:
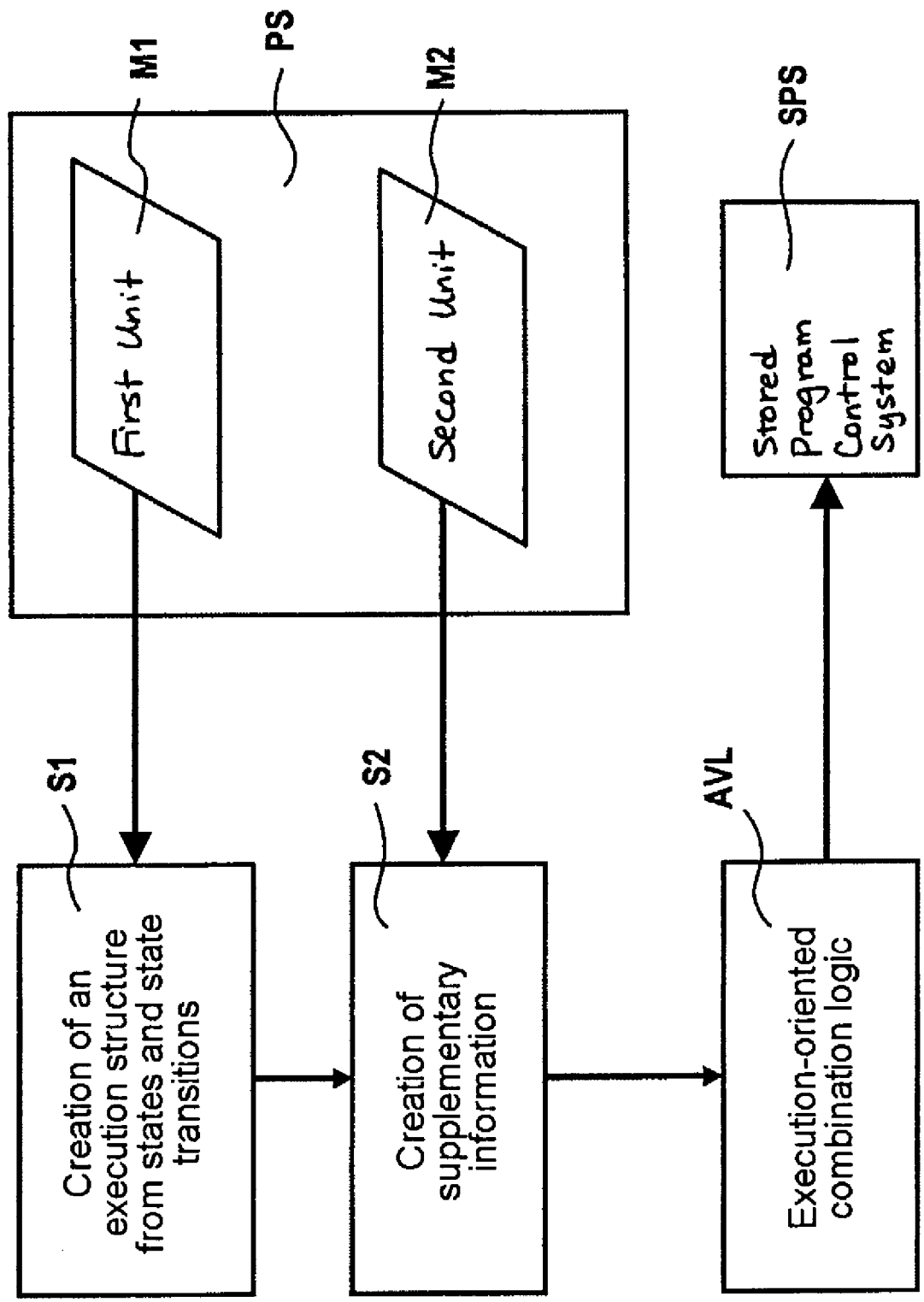
FIG. 2 shows a schematic representation of the sequence for the creation of an execution-oriented combination logic.

FIG. 2 shows a schematic representation of the sequence for the creation of an execution-oriented combination logic using the programming system PS already shown in FIG. 1. The objective of the programming system PS here is to generate an execution-oriented combination logic AVL in the form of a data program (cf. FIG. 1) which can be executed on a stored-program control system SPS. For this purpose, the programming system PS has a first unit M1. In a step S1, an execution structure is created from states and state transitions of an automation solution using the first unit M1. In a step S2, supplementary information is created using a second unit M2 of the programming system PS. As a result of the steps S1, S2 which are carried out, the execution-oriented combination logic AVL, i.e. a data program which can be executed on a stored-program control system SPS, is obtained after the entire execution structure of the automation solution to be programmed has been generated. The particular feature of the procedure represented in FIG. 2 is that the data which is generated in step S1 and in step S2 is used in a targeted fashion in a single document, specifically the execution-oriented combination logic AVL, and is thus present there in a single data store. This results, in comparison with singular separate execution-oriented programming systems or a separate combination-logic-oriented programming system, in a level of data protection which is not to be underestimated, and also in significantly reduced maintenance expenditure with respect to data maintenance for designing, programming and documentation.

Figure 3:
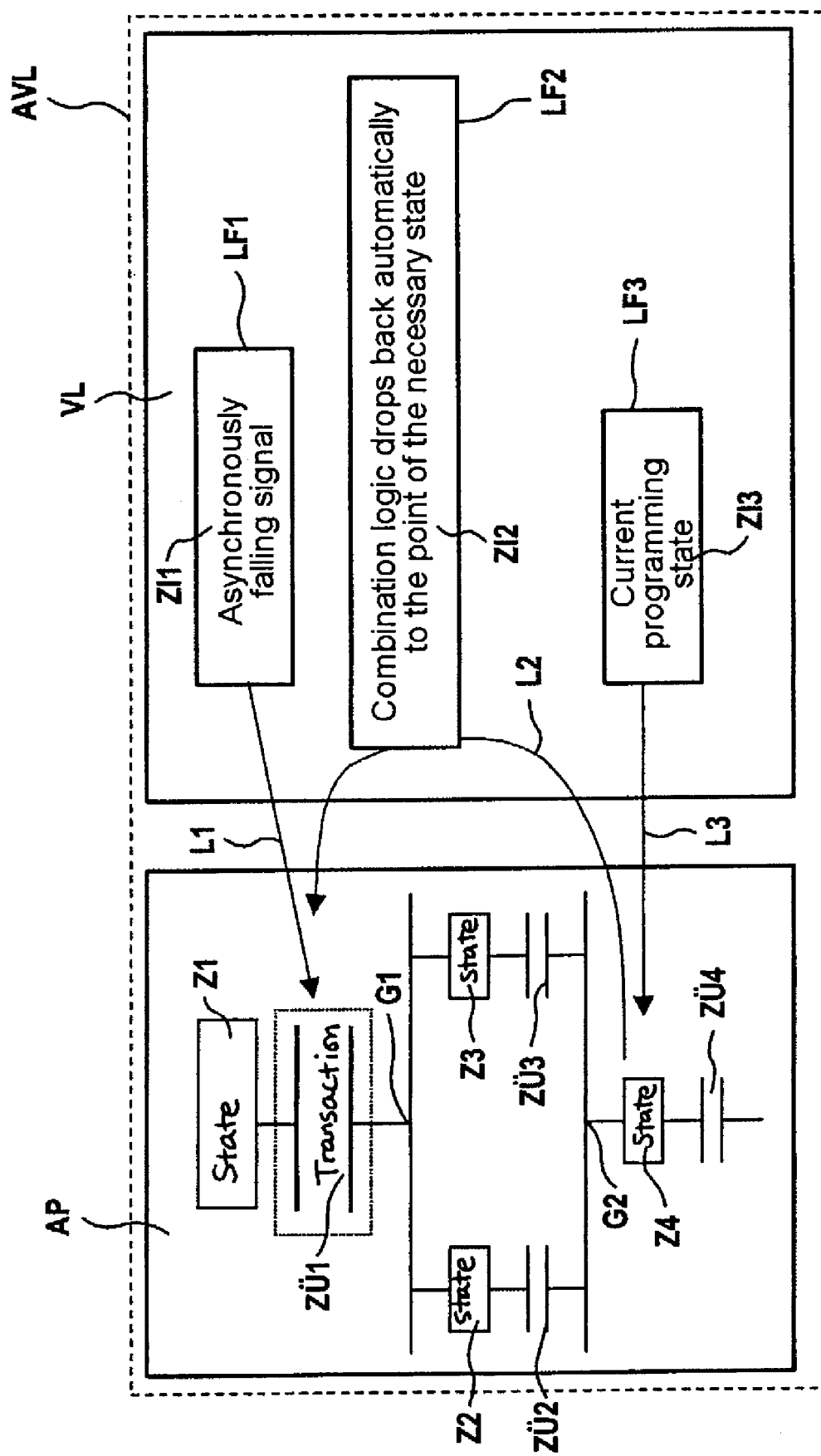
FIG. 3 shows an exemplary basic representation of an execution-oriented combination logic.

FIG. 3 shows an example of an execution-oriented combination logic AVL in a basic view. The execution-oriented combination logic AVL is composed, on the one hand, of an execution plan AP with a process engineering sequence of a schematically illustrated automation solution. The execution plan AP is composed of states Z1 . . . Z4 and of state transitions ZÜ1 . . . ZÜ4. Between the state transition ZÜ1 and the states Z2, Z3 there is a first branch G1, and between the state transitions ZÜ2, ZÜ3 and the state Z4 there is a second branch G2. The execution-oriented combination logic AVL also has a combination logic VL which is essentially composed of supplementary information ZI1 . . . ZI3 assigned to individual states or individual state transitions of the execution plan AP. The supplementary information ZI1 . . . ZI3 is respectively contained in magnifying glass functions LF1 . . . LF3 which can be assigned to the states Z1 . . . Z4 and the state transitions ZÜ1 . . . ZÜ4. The logic combination of the supplementary information ZI1 . . . ZI3 with the respective states Z1 . . . Z4 and the state transitions ZÜ1 . . . ZÜ4 is carried out by links L1 . . . L3 represented as arrows in FIG. 3.

The exemplary embodiment shown in FIG. 3 illustrates the essential basic principles of the execution-oriented combination logic. The basic principles comprise linking the execution plan AP with a combination logic VL within a single document. The execution plan AP is firstly structured here as, for example, a contact plan. The individual contacts, i.e. states Z1 . . . Z4 and state transitions ZÜ1 . . . ZÜ4 are, however, made "more powerful", specifically as the transitions in a chain of steps. Behind each contact or behind each transition there is namely a magnifying glass function LF1 . . . LF3 which can in turn be implemented in basic languages of combination-logic-oriented programming such as, for example, Kontaktplan KOP, Funktionsplanliste FUP, Anweisungsliste AWL, structure component list SCL or in turn also in an execution-oriented combination logic AVL.

FIG. 3 also illustrates that, in addition to the contacts and transitions in the form of the states Z1 ... Z3 and state transitions ZÜ1 ... ZÜ4, any desired switching points, such as the actions of a chain of steps, can be inserted into the combination logic chain of the execution plan AP. The following, for example, may be provided here as switching functions:

transition (with magnifying glass function)
  action (with magnifying glass function)
  hold element (with magnifying glass function)
  AND logic operation (parallels)
  OR logic operation
  exclusive OR, XOR (alternative)
  branching (fork)
  link The execution-oriented combination logic AVL thus constitutes a new common technology-oriented description language for automation solutions and is thus the basis of a novel engineering tool which, in particular, even permits interdisciplinary operations in the field of combination logic control systems. Both the documentation of the process engineering sequence and the combination logic are carried out here using the same tool and the same data source. When implementing the execution-oriented combination logic AVL it is possible in this case to use known engineering systems, for example the editors PCS7-SFC or Graph 7 from Siemens AG as the basis. It is also possible to use what is referred to as an AVL engine for generating an execution-oriented combination logic as the basis for an implementation in what is referred to as the runtime system, by modifying the SFC and/or Graph 7 modules.

Figure 4:
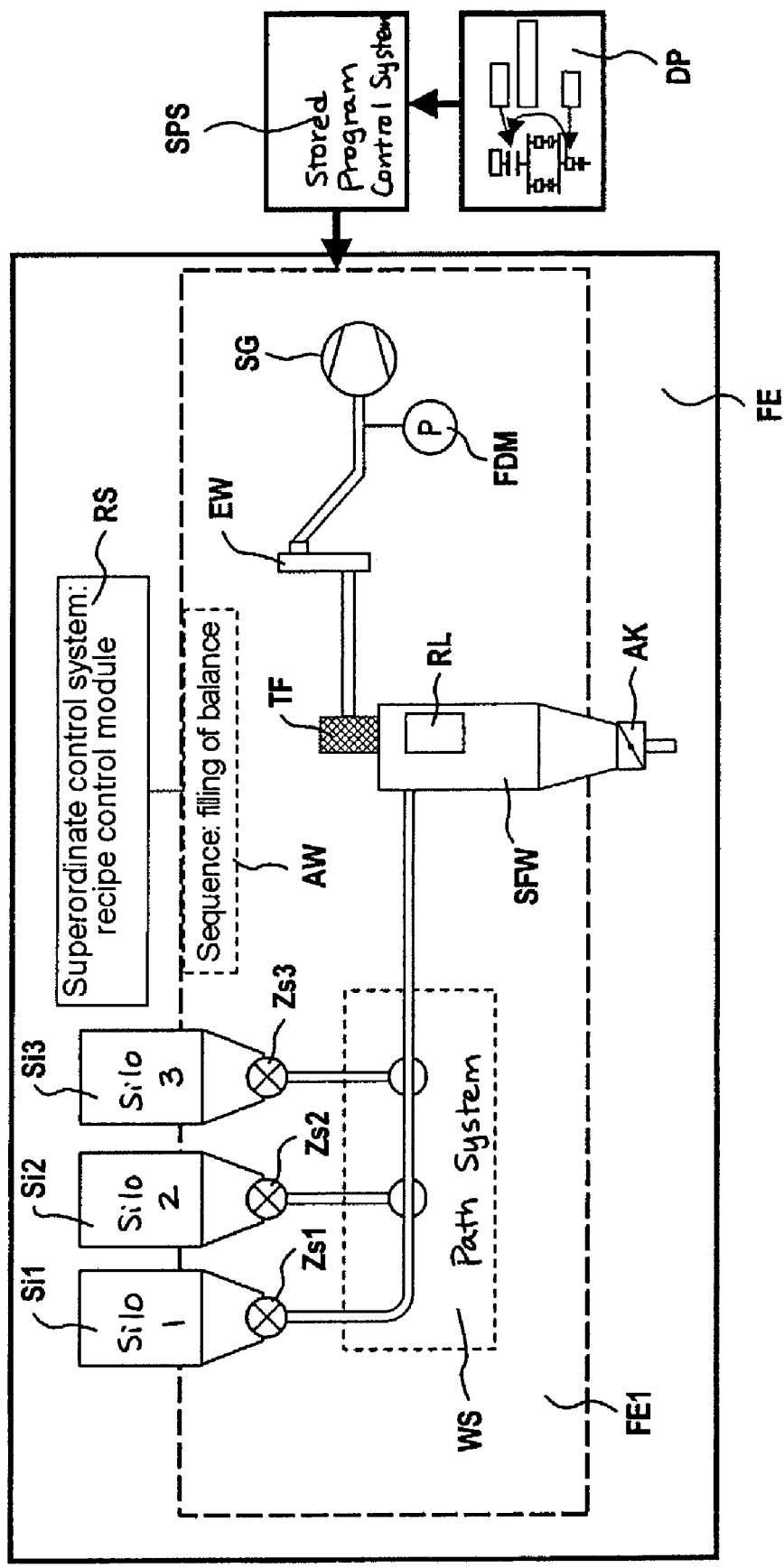
FIG. 4 shows an overview of a sequence, taking the example of the filling of a balance.
Figure 5:
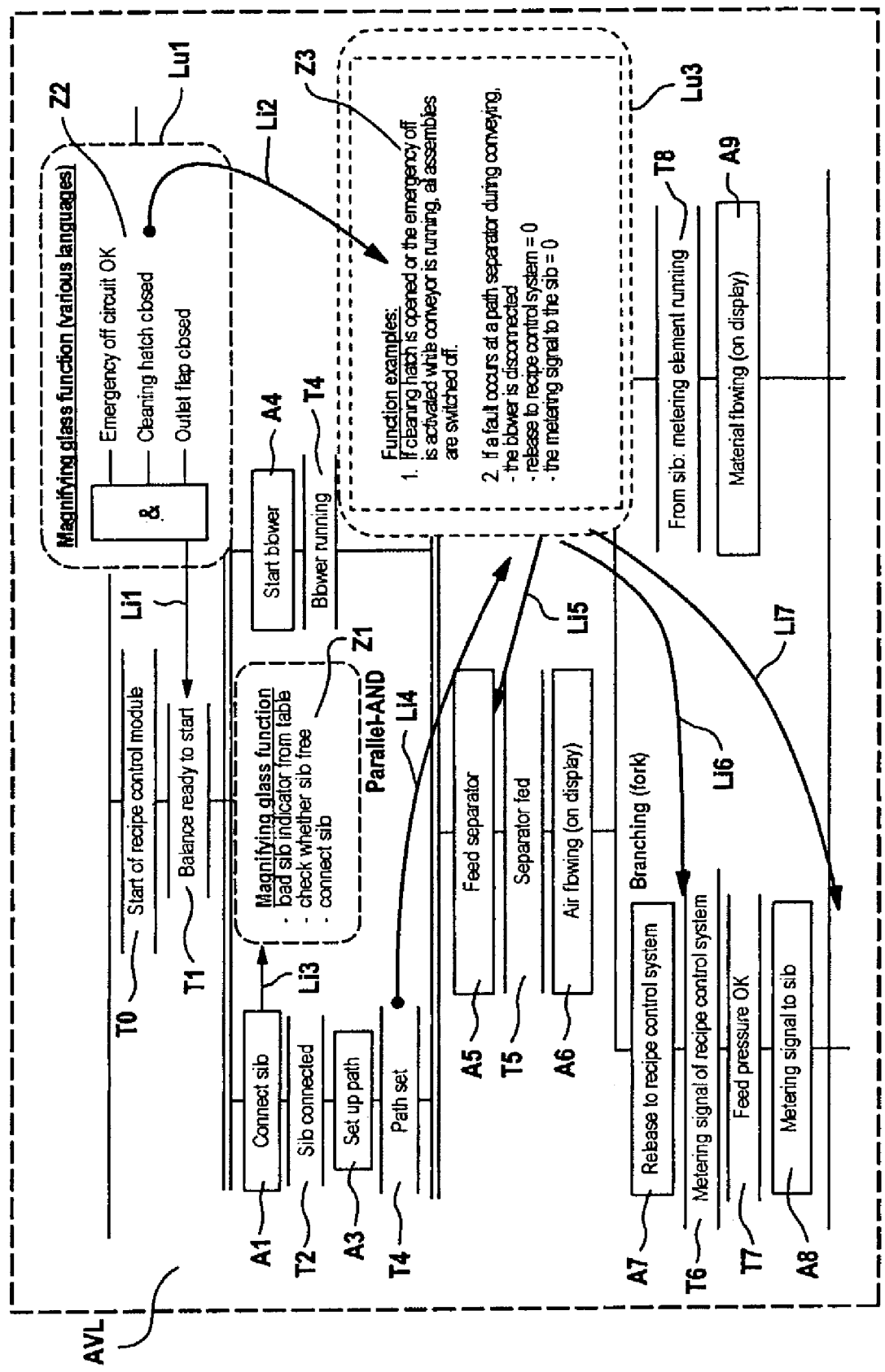
FIG. 5 shows an execution-oriented combination logic for the example shown in FIG. 4.

FIG. 4 shows an overview diagram of an automation solution which is programmed by an execution-oriented combination logic (cf. FIG. 5). The automation solution represented in FIG. 4 is used for programming a fabrication device FE. The fabrication device FE is used for filling a balance. The fabrication device FE is programmed by a stored-program control system SPS on which a data program DP can be executed using execution-oriented combination logic. Here, only the portion FE1, specifically the filling of the balance, is considered in more detail as an excerpt from the fabrication device FE. A superordinate control system RS, what is referred to as a recipe control module, is superordinate to the filling of the balance. The fabrication device FE1 which is illustrated in FIG. 4 is composed of a first silo Si1, a second silo Si2 and a third silo Si3. At the lower end of the silos Si1 ... Si3 there are in each case what are referred to as rotary feeders ZS1 ... ZS3, via which material can be conveyed from the respective silo Si1 ... Si3 to a suction conveyor balance SFW via a path system WS. At the outlet of the suction conveyor balance SFW there is an outlet flap AK, while in the upper region of the suction conveyor balance SFW there is a cleaning hatch RL. In the upper region of the suction conveyor balance there is also a separating filter EF, which is functionally connected to a separator EW, a suction blower SG and a conveyor pressure measuring device FDM.

The particular feature of the process automation system illustrated in FIG. 4 is that the automation solution of the fabrication device FE is programmed by the execution-oriented combination logic of the data program DP, as will be explained below with reference to FIG. 5.

FIG. 5 shows an exemplary execution-oriented combination logic for the exemplary embodiment of the fabrication device FE1 of the filling of the balance illustrated in FIG. 4. The execution-oriented combination logic AVL is composed of an execution plan with states A1 ... A9 as well as state transitions T1 ... T8. The individual modules of the execution plan provide supplementary information Z1 ... Z3 which is acquired by magnifying glass functions LU1 ... LU3 and links LI1 ... LI7 to the execution plan. In this way, the first state transition T0, which is also referred to below as transition, relates to the start of the recipe control module (cf. FIG. 4). The following state transition T1 relates to the "balance" ready to start state transition. The transition T1 is connected in terms of data technology to the magnifying glass function LU1 via a link Li1. The magnifying glass function LU1 contains the supplementary information Z2 in the form of an AND logic operation from "emergency OFF circuit o.k.", "cleaning hatch closed" and "outlet flap closed". At the end of the transition T1 there is branching into actions A2, A3 with transitions T2, T3, which relate to the connection of the silos and of the actuation of the associated path system (cf. FIG. 4). Associated supplementary information Z1 is located in the magnifying glass function LU2 and linked to the action A1 via a link LI3. The second branch relates to the blower control using the action A4 and the transition T4. In a similar way, the execution-oriented combination logic contains the further actions A5 ... A8 as well as the transitions T5 ... T8 which relate, on the one hand, to the mode of operation of the separator and to the recipe control with metering process. The supplementary information Z2 of the magnifying glass function LU1 is also combined with further supplementary information Z3 of a further magnifying glass function LU3 via a link LI2. This indicates that further supplementary information Z3 can also be subordinated to the information of the combination logic, for example the supplementary information Z2 of the magnifying glass function LU1, by the magnifying glass function LU3 etc.

In summary, the inventor proposes a system and a method for programming and/or operating an automation system. For low-cost programming of the automation system accompanied by a high level of data consistency, it is proposed that, in order to program the automation system, a data program DP which can be executed on a data processing device and is formed, at the time of the execution, directly from a specific execution plan which contains the sequences of the program to be carried out as well as combination logic assigned to the sequences is provided. This results in an execution-oriented combination logic which can be used for designing, programming and/or documenting the data program of the automation system. The sequences and the combination logic assigned to the sequences are based here on a single data store so that when there are program changes no data inconsistencies whatsoever are produced, in contrast to previous solutions with different databases for designing, programming and/or documentation.

The new idea comprises an engineering tool/method which presents the technological sequence as a chain of steps (or flowchart) but functions as a combination logic. This requires a system for creating and programming a computer program and an execution system for carrying out the computer program.

The invention has been described in detail with particular reference to preferred embodiments thereof and examples, but it will be understood that variations and modifications can be effected within the spirit and scope of the invention.

The invention claimed is:

1. A system stored on a computer readable medium to program an automation system, comprising:
  an execution plan with a process engineering sequence; and a combination logic assigned to the sequence, the execution plan and the combination logic forming an execution-oriented combination logic data program;

wherein the execution-oriented combination logic data program is provided for designing, programming and documentation of combination logic control system;

wherein the data program has execution-oriented combination logic based on a single data source, so that changes in the execution-oriented combination logic are thus automatically taken into account in a designing, programming and documentation.

2. The system as claimed in claim 1, wherein
the execution plan is formed from states and state transitions,
magnifying glass functions are selectively assigned to the states and state transitions, and
each magnifying glass function contains logic operations for the state and/or state transition assigned thereto.

3. The system as claimed in claim 2, wherein
the system has logic operations which can be edited by the magnifying glass functions, and
the logic operations are implemented in a combination logic language and/or in an execution-oriented combination logic language.

4. The system as claimed in claim 1, wherein
the execution plan is formed from states and state transitions,
magnifying glass functions are selectively assigned to the states and state transitions, and
each magnifying glass function contains logic operations for the state and/or state transition assigned thereto.

5. The system as claimed in claim 4, wherein
the system has logic operations which can be edited by the magnifying glass functions, and
the logic operations are implemented in a combination logic language and/or in an execution-oriented combination logic language.

6. A system stored on a computer readable medium for controlling an automation system, comprising:
a first unit to generate an execution structure from states and state transitions, for process engineering subsequences of the automation system; and
a second unit to generate supplementary information selectively assigned to the states and state transitions;
wherein designing, programming and documentation of the execution structure are based on a single data source; and
wherein the data program has execution-oriented combination logic based on the single data source, so that changes in the execution-oriented combination logic are thus automatically taken into account in the designing, programming and documentation.

7. The system as claimed in claim 6, wherein
the execution structure which is generated by the first unit and the supplementary information generated by the second unit form a data program with an execution-oriented combination logic, and
the data program is provided for execution on at least one stored-program control system of the automation system.

8. The system as claimed in claim 6, wherein
a first software object characterizes the states and state transitions and generates the execution structure, and
a second software object generates the supplementary information.

9. The system as claimed in claim 6, wherein a magnifying glass function, by which a second software object can be edited, is assigned to a first software object.

10. The system as claimed in claim 6, wherein the system has first software objects, comprising:
an "action" object type for characterizing the states, and
a "transition" object type for characterizing state transitions.

11. The system as claimed in claim 6, wherein the first and second units are configured in such a way that designing, programming and documentation of the execution structure take place essentially in one working step.

12. The system as claimed in claim 7, wherein
a first software object characterizes the states and state transitions and generates the execution structure, and
a second software object generates the supplementary information.

13. The system as claimed in claim 12, wherein a magnifying glass function, by which a second software object can be edited, is assigned to a first software object.

14. The system as claimed in claim 13, wherein the system has first software objects, comprising:
an "action" object type for characterizing the states, and
a "transition" object type for characterizing state transitions.

15. The system as claimed in claim 14, wherein the first and second units are configured in such a way that designing, programming and documentation of the execution structure take place essentially in one working step.

16. A method for controlling an automation system, comprising:
generating an execution structure from states and state transitions, for process engineering subsequences of the automation system, and
assigning supplementary information in the form of a combination logic, to the states and to the state transitions;
wherein designing, programming and documentation of the execution structure are based on a single data source; and
wherein the data program has execution-oriented combination logic based on the single data source, so that changes in the execution-oriented combination logic are thus automatically taken into account in the designing, programming and documentation.

17. A computer readable medium storing a program for controlling at least one computer to perform a control method for an automation system, the method comprising:
generating an execution structure from states and state transitions, for process engineering subsequences of the automation system, and
assigning supplementary information in the form of a combination logic, to the states and to the state transitions;
wherein designing, programming and documentation of the execution structure are based on a single data source; and
wherein the data program has execution-oriented combination logic based on the single data source, so that changes in the execution-oriented combination logic are thus automatically taken into account in the designing, programming and documentation.

18. A system stored on a computer readable medium for controlling an automation system, comprising:
first means for generating an execution structure from states and state transitions, for process engineering subsequences of the automation system; and
second means for generating supplementary information selectively assigned to the states and state transitions;

wherein designing, programming and documentation of the execution structure are based on a single data source; and wherein the data program has execution-oriented combination logic based on the single data source, so that changes in the execution-oriented combination logic are thus automatically taken into account in the designing, programming and documentation.

* * * * *